United States Patent Office 3,586,483
Patented June 22, 1971

3,586,483
METHOD FOR DETECTING THE PRESENCE OF TETRACYCLINE ANTIBIOTICS
John Gerard Heider, West Nyack, and Robert Gerard Kelly, Monsey, N.Y., assignors to American Cyanamid Company, Stamford, Conn.
No Drawing. Continuation-in-part of application Ser. No. 675,055, Oct. 13, 1967. This application Oct. 14, 1968, Ser. No. 767,515
Int. Cl. G01n 21/06, 21/38, 33/16
U.S. Cl. 23—230
6 Claims

ABSTRACT OF THE DISCLOSURE

A fast, reliable test is provided for detecting the presence of tetracycline antibiotics in biological fluids, such as urine, by adsorbing a portion of the fluid on an adsorbent strip containing a complexing metal that forms a fluorescent metal complex with the antibiotic and observing the fluorescence of the metal complex under ultraviolet light. This test method is particularly useful in allowing clinicians to quickly and reliably determine whether patients on tetracycline therapy have received their medication.

---

This application is a continuation-in-part of our copending application Ser. No. 675,055 filed Oct. 13, 1967, now abandoned.

This invention relates to a method for detecting antibiotics, and more particularly, to a quick and accurate test method for detecting the presence of tetracycline antibiotics in biological fluids.

The extensive use of tetracycline antibiotics in the treatment of human beings and animals that produce foodstuffs for human consumption has created the need for a quick and accurate test method for detecting the presence of tetracycline in biological fluids, such as urine or milk. These tests are useful in hospitals, and in physicians' and veterinarians' offices in allowing clinicians to quickly and reliably determine whether patients on tetracycline therapy have received the required medication. They are particularly valuable in the case of small children or animals where the subject cannot be depended on to reveal whether the medication has been administered.

Because of the need for such tests, many methods have been proposed for determining the presence of tetracycline antibiotics in various solutions. These test methods, however, are generally time-consuming and require the use of expensive laboratory equipment. Moreover, these tests are not always reliable and generally are not sensitive enough to detect minute quantities of tetracycline in biological fluids at concentrations which may be as low as one (1) microgram per milliliter or even lower.

It is therefore a primary object of this invention to provide an improved method for detecting the presence of tetracycline antibiotics in biological fluids.

Another object of this invention is to provide a rapid and reliable test method for detecting the presence of tetracycline antibiotics in biological fluids, such as urine.

Yet another object of this invention is to provide a method for detecting the presence of tetracycline antibiotics in biological fluids at concentrations as low as one (1) microgram per milliliter and even lower.

A further object of this invention is to provide a process for detecting the presence of tetracycline antibiotics in biological fluids by forming a fluorescent metal complex of the tetracycline and observing the fluorescence of the complex under ultraviolet light.

Yet a further object of this invention is to provide an inexpensive and simple method that may be used by relatively unskilled or semi-skilled personnel in hospitals and physicians' or veterinarians' offices to quickly and accurately determine whether patients, human or animal, on tetracycline therapy have received their medication.

Additional objects and advantages will be set forth in part in the description which follows, and in part will be obvious from the description or may be learned by practice of the invention, the objects and advantages being realized and attained by means of the methods, combinations of steps, and improvements particularly pointed out in the appended claims.

To achieve the foregoing objects and in accordance with its purpose, this invention, as embodied and broadly described, provides a method for detecting the presence of tetracycline antibiotics in biological fluids. This method comprises contacting the fluid to be tested with an adsorbent material containing a complexing metal that forms a fluorescent metal complex with tetracycline, and exposing the adsorbent material to ultraviolet light to produce fluorescence of the complex if the antibiotic is present in the fluid.

It is to be understood that both the foregoing general description and the following detailed description are exemplary and explanatory but are not restrictive of the invention.

Tetracycline antibiotics, when administered to human beings or animals, are adsorbed into the body fluids, and particularly into the bloodstream and urine. Since urine specimens are easily obtained, detection of the antibiotic in the urine provides a simple and reliable method for determining whether tetracycline medication has been properly administered to the patient.

It has now been discovered that the presence of tetracycline antibiotics in body fluids, and particularly in urine, or other fluids, such as milk, can be quickly and reliably detected by forming a metal complex of tetracycline that induces fluorescence under ultraviolet light.

The tetracycline antibiotics that can be detected by the process of this invention include any one or more of the members of the tetracycline family of antibiotics, such as tetracycline, chlorotetracycline, oxytetracycline, demethyltetracycline, demethylchlorotetracycline, 7-dimethylamino-6-deoxy-6-demethyltetracycline, and the like. The term tetracycline, therefore, as used throughout this specification and claims, is intended to include any member of the tetracycline family of antibiotics, or mixtures of two or more of such antibiotics.

In accordance with this invention, the biological fluid to be tested is contacted with an adsorbent material containing one or more complexing metals that form a fluorescent metarl complex with tetracycline. The adsorbent material adsorbs a portion of the fluid and the tetracycline antibiotic in the fluid reacts with the complexing metal to form the fluorescent tetracycline-metal complex on the adsorbent material. The adsorbent material is then viewed under ultraviolet light where the fluorescence of the metal complex indicates the presence of the antibiotic in the fluid.

Complexing metals that are useful in the process of this invention include any metal that forms a fluorescent tetracycline-metal complex. Examples of such complexing metals are calcium, magnesium, aluminum, zirconium and barium.

The presence of even very minor amounts of complexing metal in the adsorbent material is sufficient to produce a visible fluorescent metal complex under ultraviolet light. Thus, in some cases the complexing metal can be present as a known impurity in the adsorbent material.

A wide variety of adsorbent materials containing one or more of the above complexing metals is useful in the process of this invention. Exemplary of suitable adsorbent materials are silica gel-impregnated fiberglass paper, alumina-impregnated fiberglass paper, or sodium silicate-impregnated fiberglass paper.

A preferable adsorbent material for use in the process of this invention is sodium silicate-impregnated fiberglass paper, manufactured by Gelman Instrument Company of Ann Arbor, Michigan, and identified as Instant Thin Layer Chromatography Sheets (ITLC Sheets), Type S.

In accordance with this invention the adsorbent material is prepared in the form of strips having a substantially greater length than width. One of these strips is dipped a small portion of its length into the fluid to be tested. As the biological fluid is adsorbed and flows up the strip, tetracycline molecules are continuously brought into contact with the portion of the strip immersed in the fluid, where they form tetracycline-metal complexes with the complexing metal present in that portion of the adsorbent material. The tetracycline is thereby concentrated at the base of the strip to enhance the degree of fluorescence of the metal complex, and in turn, the ease of determining the presenc of tetracycline in the biological fluid.

Preferably, the adsorbent strip is wedge-shaped and is used with its pointed end down. Such a shape not only accelerates movement of the biological fluid up the strip, due to the increasing width with height, but also concentrates the tetracycline in a smaller area at the pointed end of the wedge-shaped strip than would be possible with other shaped strips, thereby further enhancing the degree of fluorescence of the metal complex. While wedge-shaped strips are preferred in the method of this invention because they concentrate the tetracycline in a relatively small area, the strips may also be rectangular or of any other desired shape.

In a particular embodiment of the process of this invention, wedge-shaped strips are prepared from Type S, ITLC sheets having a length of about 9 cm., a width of about 2 cm. at the wide end, and a width of about 0.1 cm. at the narrow end.

The strip is dipped, pointed end down, to a depth of about 0.5 cm. into 1 ml. of a urine specimen. After the liquid has risen to a height of approximately 7 cm. on the strip, the strip is removed from the specimen and immediately viewed under ultraviolet light. The presence of tetracycline in the specimen is indicated by a distinctly visible band of yellow fluorescence at the pointed end of the strip.

In accordance with this invention, it has been found that white to bluish-white fluorescence, which is present in many biological fluids, occasionally interfers with visible detection of the yellow fluorescence of the tetracycline-metal complex. This problem is particularly troublesome with the detection of low concentrations of tetracycline. This fluorescent interference can be eliminated, however, by dipping the adsorbent strips into water for about 20 to 30 seconds after they have been contacted with the biological fluid. As the water is adsorbed by the strip, it washed away the biological fluid at the base of the strip leaving only the tetracycline metal complex which can then be readily observed under ultraviolet light.

It also has been found that in cases where extremely small concentrations of tetracyclines are present in the biological fluid, the degree of fluorescence of the tetracycline-metal complex can be enhanced by the addition of a few drops of a dilute solution of calcium caseinate or milk to the biological fluid. The addition of this fluorescence-enhancing agent has been found particularly desirable at low tetracycline concentration levels, such as, for example, about one (1) microgram per milliliter of the biological fluid.

While the process of this invention has particular use in the detection of tetracycline antibiotics in urine, the process may also be used with other biological fluids, such as milk; fermentation broths, for example, Trypticase soy broth, and the like.

For a clear understanding of this invention, specific examples of it are set forth below. These examples are merely illustrative and are not to be understood as limiting the scope and underlying principles of the invention in any way.

EXAMPLE 1

40 mg. of tetracycline HCl are injected intravenously into a dog weighing about 8 kg. Urine samples are taken by catheter at 0, 2, 4, 8 and 24 hours after injection of the antibiotic, and 1 ml. aliquots of the samples are placed in 5 ml. beakers.

Wedge-shaped strips, cut from Type S, ITLC sheets, are then dipped into each beaker to a depth of about 0.5 cm. The strips are permitted to remain in the samples until the fluid has ascended to a height of about 7 cm. on each strip and are then removed and immediately viewed under a source of ultraviolet light.

The control sample at 0 hour shows only the faint bluish-white fluorescent characteristic of the urine, indicating the absence of any tetracycline in this urine sample. The 2 and 4 hour samples, however, are profusely yellow under ultraviolet light, and the 8 and 24-hour samples show a definite yellow fluorescent band at the base of the strip, thus indicating the presence of the tetracycline antibiotic in these samples.

The 2 and 4-hour samples are profusely yellow because they contain a high concentration of tetracycline antibiotic. Even after dilution of these samples with water, at a ratio of 1 to 10, retesting of these diluted samples with new adsorbent strips produces a definite band of yellow fluorescence at the base of the strip.

EXAMPLE 2

To illustrate the effectiveness of the testing procedure of this invention, 1 ml. samples of urine having concentrations of 1 microgram per milliliter, 5 micrograms per milliliter, and 10 micrograms per milliliter of tetracycline are prepared. The samples are tested according to the procedure of Example 1, and each strip shows a definite yellow fluorescent band at the base of the strip under ultraviolet light, thus indicating the presence of the tetracycline in each sample.

The samples of urine containing higher concentrations of antibiotic, of course, produce a greater degree of fluorescence on the adsorbent material, but the yellow fluorescence of the 1 microgram per milliliter sample is easily detected.

EXAMPLE 3

A 1 ml. sample of urine is prepared containing 10 micrograms per milliliter of chlorotetracycline. The testing procedure of Example 1 is repeated and the strip of adsorbent material is then viewed under ultraviolet light. A clear band of yellow fluorescence is observed at the base of the strip, thus confirming the presence of this antibiotic in the urine.

EXAMPLE 4

A 1-ml. sample of urine is prepared containing 10 micrograms per milliliter of demethylchlorotetracycline. The testing procedure of Sample 1 is repeated and the adsorbent strip is then viewed under ultraviolet light. A distinct band of yellow fluorescence is observed at the base of the strip, thus confirming the presence of this antibiotic in the urine.

EXAMPLE 5

A 1-ml. sample of Trypticase soy broth is prepared containing 1 microgram per milliliter of tetracycline and this fluid is tested for the presence of antibiotic according to the procedure of Example 1. The soy broth is found, however, to contain considerable white fluorescent interference that obscures the yellow fluorescence of the tetracycline metal complex under ultraviolet light.

The adsorbent strip is then dipped into water for about 20 to 30 seconds and again viewed under ultraviolet light. A definite band of yellow fluorescence is observed at the base of the strip, thus confirming the presence of even this minute quantity of tetracycline in the broth.

EXAMPLE 6

Example 5 is repeated, except that a few drops of milk are added to the tetracycline-containing broth before it is tested according to procedure of Example 1. On viewing the adsorbent strip under ultraviolet light, it is found that the yellow fluorescence of the tetracycline metal complex is greatly enhanced over that of the strip of Example 5.

EXAMPLE 7

Twenty-six milligrams of minocycline HCl (CL 59,806) were administered orally to a 2.6 kg. monkey. Urine samples were collected at 0–8, 8–24, 24–48 and 144–168 hours. Four other collections were made between 48–144 hours. One milliliter aliquots of these urine samples were taken and placed in 5 ml. beakers. The samples were made alkaline with 0.2 ml. (5 drops) of 6 N (24% w./v.) sodium hydroxide. The urine solutions were stirred and a wedge-shaped strip as used in the preceding examples was inserted into each sample. When the liquid had risen to a height of approximately 5 cm. (2 inches), the dipsticks were removed and dried at 100°. This was accomplished in a drying oven but satisfactory results could also be obtained by placing the dipsticks in a beaker in a boiling water bath for 8–10 minutes. The dipsticks were then viewed under an ultraviolet light in the dark. The presence of minocycline was indicated by the orange-pink band at the base of the dipstick. The first two sample, i.e., 0–8 and 8–24 hours were found to have approximately 10 mcg./ml., the third, 24–48-hour, less than 10 mcg./ml., and the fourth, 144–168-hour, no detectable amount of minocycline. These results are in agreement with analyses carried out by a different procedure.

As in the case of other tetracyclines, occasionally in some urine specimens interference is found from substances in the urine which give a yellow fluorescence. However, this can be eliminated by diluting the urine 1:1 to 1:10 before addition of sodium hydroxide solution. If the yellow fluorescence persists, the dipstick is then held over HCl until no fluorescence is visible then held over $NH_4OH$ and reheated at 100°. The presence of minocycline is indicated by the orange-pink fluorescent band at the base of the dipstick.

The invention in its broader aspects is not limited to the specific details shown and described, and departures may be made from such details within the spirit and scope of the accompanying claims without departing from the principles of the invention and without sacrificing its chief advantages.

We claim:

1. A method for detecting the presence of tetracycline antibiotics in biological fluids which comprises contacting the fluid to be tested with an adsorbent strip containing a complexing metal that forms a fluorescent metal complex with the tetracycline antibiotic, and exposing the adsorbent strip to ultraviolet light to produce fluorescence of the complex if the antibiotic is present in the fluid.

2. The process of claim 1, wherein the complexing metal is selected from the group consisting of calcium, magnesium, zirconium, aluminum and barium.

3. The process of claim 1, wherein the adsorbent strip is a sodium silicate-impregnated fiberglass strip.

4. The process of claim 1, wherein the biological fluid is urine.

5. The process of claim 4, wherein the fluid contains tetracycline.

6. The process of claim 4, wherein the fluid contains 7-dimethylamino-6-deoxy-6-demethyltetracycline.

References Cited

C.A. 59: 5475a (1963).

MORRIS O. WOLK, Primary Examiner

S. MARANTZ, Assistant Examiner

U.S. Cl. X.R.

23—253; 260—559; 424—7